US008085142B2

(12) United States Patent
Kawase et al.

(10) Patent No.: US 8,085,142 B2
(45) Date of Patent: Dec. 27, 2011

(54) RECEIVER FOR TIRE CONDITION MONITORING APPARATUS

(75) Inventors: Shinichi Kawase, Ichinomiya (JP); Takashi Takeyama, Ichinomiya (JP); Syuji Aoyama, Aichi-ken (JP)

(73) Assignee: Pacific Industrial Co., Ltd. (JP)

( * ) Notice: Subject to any disclaimer, the term of this patent is extended or adjusted under 35 U.S.C. 154(b) by 399 days.

(21) Appl. No.: 12/409,794

(22) Filed: Mar. 24, 2009

(65) Prior Publication Data
US 2010/0109858 A1 May 6, 2010

(30) Foreign Application Priority Data
Nov. 6, 2008 (JP) ................................. 2008-285193

(51) Int. Cl.
B60C 23/00 (2006.01)
(52) U.S. Cl. ...................... 340/447; 340/425.5; 340/10.1
(58) Field of Classification Search .................. 340/447, 340/445, 442, 438, 425.5, 10.4, 10.1, 1.1
See application file for complete search history.

(56) References Cited

U.S. PATENT DOCUMENTS

| | | | | |
|---|---|---|---|---|
| 6,486,773 B1 * | 11/2002 | Bailie et al. | | 340/445 |
| 6,501,372 B2 * | 12/2002 | Lin | | 340/442 |
| 6,604,416 B2 * | 8/2003 | Tsujita | | 73/146.5 |
| 7,053,761 B2 * | 5/2006 | Schofield et al. | | 340/447 |
| 7,119,661 B2 * | 10/2006 | Desai et al. | | 340/5.61 |
| 7,119,670 B2 * | 10/2006 | Hammerschmidt | | 340/447 |
| 2002/0073771 A1 * | 6/2002 | Katou | | 73/146 |
| 2004/0239492 A1 | 12/2004 | Katou | | |
| 2006/0279411 A1 * | 12/2006 | Reimus et al. | | 340/10.33 |

FOREIGN PATENT DOCUMENTS

| | | |
|---|---|---|
| EP | 1215056 A2 | 6/2002 |
| EP | 1481823 A1 | 12/2004 |
| JP | 2003025818 | 1/2003 |
| JP | 2004056346 | 2/2004 |

OTHER PUBLICATIONS

European Search Report for Application No. 09154564.0-2425 dated Jan. 20, 2010.

* cited by examiner

*Primary Examiner* — Daniel Previl
(74) *Attorney, Agent, or Firm* — Caesar, Rivise, Bernstein, Cohen & Pokotilow, Ltd.

(57) ABSTRACT

A receiver includes two reception antennas, which receive a modulated wave (transmission signal) from each of transmitters, a selection circuit, which alternately selects one of the two reception antennas at a predetermined switching cycle to alternately obtain the modulated wave from the two reception antennas, and a demodulation section, which generates a demodulated signal by demodulating the modulated wave obtained at the selection circuit. The switching cycle is 27 μs, which is 1/7.4 of the transmission time of data per symbol in the transmission signal from each transmitter, that is, 200 μs. In other words, the modulated waves from the two reception antennas are alternately obtained at least seven times each while the data of one symbol is transmitted.

8 Claims, 4 Drawing Sheets

RECEIVER FOR TIRE CONDITION MONITORING APPARATUS

BACKGROUND OF THE INVENTION

The present invention relates to a receiver for a tire condition monitoring apparatus applied to a vehicle, and more specifically, the present invention pertains to a technology for receiving tire condition detection signals wirelessly transmitted from transmitters mounted on vehicle tires by a receiver provided on a vehicle body in a suitable manner.

Wireless type tire condition monitoring apparatuses have been proposed for permitting a driver to check the conditions of vehicle tires from the interior of the passenger compartment (for example, refer to Japanese Patent No. 3596490). One such tire condition monitoring apparatus includes transmitters and a receiver. Each transmitter is attached to one of vehicle tires, and the receiver is provided in the body of the vehicle. Each transmitter detects the condition of the corresponding tire, that is, the internal air pressure and the internal temperature, and transmits a tire condition detection signal on a radio wave from a transmission antenna. The receiver receives the tire condition detection signal from each transmitter through a reception antenna, and displays the information of the tire condition on a display provided in the passenger compartment as necessary.

In the above-mentioned tire condition monitoring apparatus, the radiation direction of the radio wave from each transmitter changes as the associated tire is rotated, and various vehicle body components that have influence on the radio waves exist between the transmitters and the reception antenna. Thus, electromagnetic interference such as multipath fading easily occurs, and the radio wave from each transmitter is not reliably received by the receiver. FIG. 4 is a graph showing an example of the relationship between the rotational angle of the tire and the radio wave reception level at the receiver. As shown in FIG. 4, points where the reception level decreases extremely, that is, null points occur while the tire rotates once, for example, due to multipath fading. At the null points, the reception level becomes less than a permissible level, and thus the radio wave from the transmitter cannot be substantially received.

To solve the above-mentioned problem, a tire condition monitoring apparatus that employs a space diversity system has been proposed in, for example, Japanese Patent No. 4041958. The receiver for tire condition monitoring apparatus disclosed in the above publication includes units each having a reception antenna. The units can be connected in series. Each unit includes a demodulated signal generating section, a reception level signal generating section, a comparator circuit, and a selection circuit. The demodulated signal generating section demodulates a reception signal supplied from the reception antenna of the associated unit, and outputs a demodulated signal to the selection circuit. The reception level signal generating section generates a reception level signal that represents the level of the reception signal, and outputs the reception level signal to the comparator circuit and the selection circuit. The comparator circuit compares the reception level signal of the associated unit with the reception level signal input from another unit. Then, the comparator circuit generates a selection indicator signal corresponding to the comparison result and outputs the signal to the selection circuit. The selection circuit performs switching operation so as to select the reception signal having greater level from the reception signal of the associated unit and the reception signal of the other unit based on the selection indicator signal. More specifically, the selection circuit receives the demodulated signal and the reception level signal from another unit in addition to the demodulated signal and the reception level signal of the associated unit. Then, when the reception level signal of the associated unit is greater than the reception level signal of the other unit, the selection circuit selects and outputs the demodulated signal and the reception level signal of the associated unit. When the reception level signal of the associated unit is smaller than the reception level signal of the other unit, the selection circuit selects and outputs the demodulated signal and the reception level signal of the other unit.

Therefore, when at least two or more of the above-mentioned units are connected in series, the reception signal having the greatest level is output from the final stage unit. That is, in the receiver of the apparatus disclosed in the above-mentioned Japanese Patent No. 4041958, among signals simultaneously received by spatially separated reception antennas, the signal having the greatest level can be selected and used.

The receiver of the apparatus disclosed in the above-mentioned Japanese Patent No. 4041958 requires several units each including the demodulated signal generating section, the reception level signal generating section, the comparator circuit, and the selection circuit to achieve space diversity. Therefore, the configuration of the receiver is complicated and costs are increased.

To simplify the configuration and reduce the costs, the configuration of the apparatus disclosed in the above-mentioned Japanese Patent No. 4041958 may be changed to be provided with a plurality of reception level signal generating sections respectively generating reception level signals representing the level of the reception signals sent from reception antennas, a single comparator circuit, which compares the reception level signals and generates a selection indicator signal corresponding to the comparison result, a single selection circuit, which performs switching operation to select the reception signal having the greatest level based on the selection indicator signal, and a single demodulated signal generating section, which demodulates the reception signal selected by the selection circuit. With this configuration, the comparator circuit, the selection circuit, and the demodulated signal generating section may be provided only one each.

In the above-mentioned configuration, it takes a certain time to determine the level of the reception signals sent from the reception antennas and perform switching operation to select the reception signal having the greatest level. However, the transmitters of the tire condition monitoring apparatus are generally configured to intermittently transmit a relatively short data frame (for example, a length of several microseconds to several tens of microseconds) at predetermined time intervals (for example, one minute intervals). Thus, even if the level of the reception signals are determined and switching operation is performed to select the reception signal having the greatest level while receiving such a short data frame, the data frame cannot actually be completely demodulated due to the time required for the switching operation, and results in the occurrence of a bit error.

SUMMARY OF THE INVENTION

Accordingly, it is an objective of the present invention to provide a receiver for a tire condition monitoring apparatus that has a simple configuration, reduces the costs, and receives signals wirelessly transmitted from transmitters in a suitable manner.

To achieve the above objective, the present invention provides a receiver for a tire condition monitoring apparatus that receives a tire condition detection signal transmitted from a transmitter provided in a tire of a vehicle on a modulated wave. The receiver includes at least two reception antennas, a selecting section, and a demodulation section. The reception antennas receive the modulated wave. The selecting section alternately selects the at least two reception antennas at a predetermined switching cycle to alternately obtain the modulated wave from the at least two reception antennas. The demodulation section generates a demodulated signal by demodulating the modulated wave obtained at the selecting section. The switching cycle is half or less of the transmission time of data per symbol in the tire condition detection signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

In the following, one embodiment of the present invention will now be described with reference to the drawings.

Figure 1:
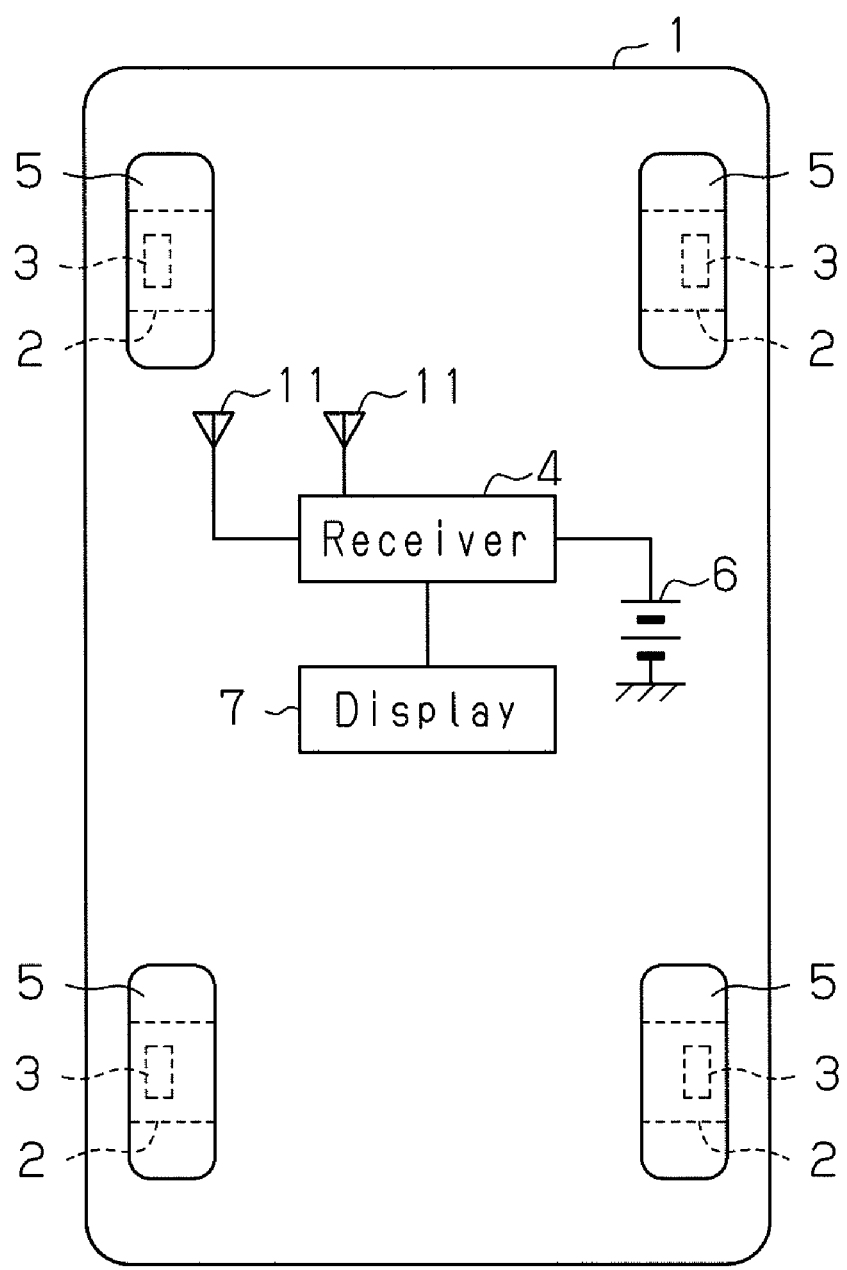
FIG. 1 is a schematic diagram illustrating a vehicle on which a tire condition monitoring apparatus according to one embodiment of the present invention is mounted.

As shown in FIG. 1, a tire condition monitoring apparatus includes four transmitters 3 and a receiver 4. Each transmitter 3 is attached to one of four wheels 2 of a vehicle 1. The receiver 4 is located in a body of the vehicle 1. Each transmitter 3 is fixed to the wheel 2 to which a tire 5 is attached such that the transmitter 3 is located in the interior of the tire 5. Each transmitter 3 measures the condition of the corresponding tire 5 (for example, the internal air pressure and the internal temperature), and transmits a signal including data representing the tire condition obtained by the measurement, that is, a tire condition detection signal, which is a baseband signal in this embodiment, on a radio wave (modulated wave). In the preferred embodiment, each transmitter 3 transmits a baseband signal, which is a PCM signal, through frequency modulation. The center frequency of a carrier wave used in frequency modulation is, for example, 315 MHz, and the transmission rate (bit rate) is, for example, 5 kbps. The modulation is, for example, a binary modulation, and thus, if the transmission rate is 5 kbps, a symbol rate is 5 kbaud.

Each transmitter 3 performs tire condition measuring operation regularly at first predetermined time intervals (for example, 15-second intervals), and performs transmitting operation regularly at second predetermined time intervals (for example, one-minute intervals), which is longer than the first predetermined time intervals. However, if the measured tire condition is abnormal (for example, abnormal decrease in the internal pressure of the tire 5 or rapid change in the internal pressure of the tire 5), the transmitter 3 immediately performs transmitting operation regardless of the regular transmitting operation. In one cycle of the transmitting operation, each transmitter 3 transmits a relatively short data frame (for example, a length of several microseconds to several tens of microseconds) once or several times consecutively.

The receiver 4 is located at a predetermined position in the vehicle body, and is activated, for example, by electricity of a battery 6 of the vehicle 1. The receiver 4 includes two reception antennas 11, that is, a first reception antenna and a second reception antenna. The receiver 4 receives signals transmitted by the transmitters 3 through the reception antennas 11, and processes the reception signals. A display 7 connected to the receiver 4 is arranged in the area where a driver of the vehicle 1 can see such as in a passenger compartment, and displays the processing results of the receiver 4.

Figure 2:
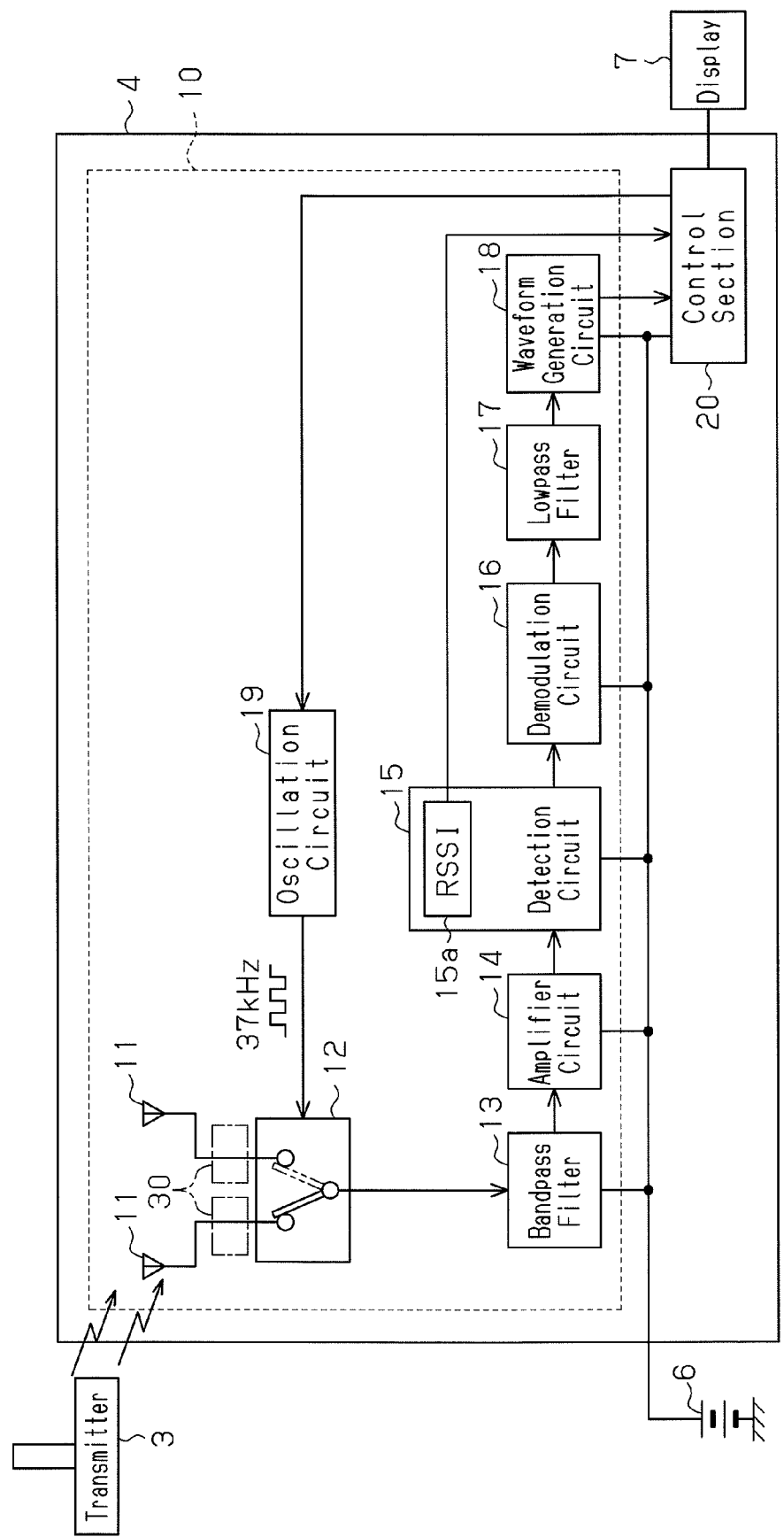
FIG. 2 is a block diagram showing the receiver in the tire condition monitoring apparatus of FIG. 1.

As shown in FIG. 2, the receiver 4 includes a reception section 10 and a control section 20. The reception section 10 includes the two reception antennas 11, a selection circuit (selector switch) 12, a bandpass filter (BPF) 13, an amplifier circuit 14, a detection circuit 15, a demodulation circuit 16, a lowpass filter (LPF) 17, a waveform generation circuit 18, and an oscillation circuit 19.

The two reception antennas 11 are preferably arranged apart from each other with a spacing corresponding to a quarter wavelength of the center frequency of the carrier wave used in transmitting signals from the transmitters 3. For example, when the center frequency of the carrier wave is 315 MHz, the two reception antennas 11 are arranged apart from each other with a spacing of 24 cm.

A selecting section, which is the selection circuit 12 in this embodiment, performs switching operation at a predetermined switching frequency (37 kHz in this embodiment), in other words, at a predetermined switching cycle (27 µs in this embodiment) so as to alternately select the two reception antennas 11. The oscillation circuit 19 supplies a rectangular wave switching signal having the predetermined switching frequency to the selection circuit 12, and causes the selection circuit 12 to perform the switching operation.

The bandpass filter 13 permits only reception signals in a predetermined frequency range to pass so as to remove noise contents from the frequency component of the reception signal (modulated wave) sent from each reception antenna 11. The amplifier circuit 14 includes a low-noise amplifier circuit (LNA), and amplifies the modulated wave that has passed through the bandpass filter 13 and outputs the amplified modulated wave to the detection circuit 15. The detection circuit 15 converts the modulated wave input from the amplifier circuit 14 to a voltage signal. The detection circuit 15 includes an RSSI circuit 15a, and the RSSI circuit 15a detects the strength of the reception signal and outputs an RSSI voltage to the control section 20. The demodulation circuit 16 demodulates the voltage signal input from the detection circuit 15 to convert it to a demodulated signal, which is a baseband signal. The detection circuit 15 and the demodulation circuit 16 function as a demodulation section, which demodulates the modulated wave and generates the demodulated signal. The lowpass filter 17 removes a high-frequency noise content, which is superimposed on the demodulated signal input from the demodulation circuit 16. The waveform generation circuit 18 forms the waveform of the demodulated signal input from the lowpass filter 17.

The control section 20 is configured by a microcomputer including a CPU, a ROM, and a RAM, and controls the operation of the entire receiver 4. The control section 20 grasps the condition of the tire 5 corresponding to the transmitter 3 that is the source of the received data based on the demodulated signal input from the waveform generation circuit 18, and displays the information of the tire condition on the display 7 as necessary. Also, the control section 20 controls the oscillation circuit 19 so as to supply the switching signal to the selection circuit 12.

Next, the manner for processing the reception signal executed by the receiver 4 will be described with reference to FIG. 3.

Figure 3:
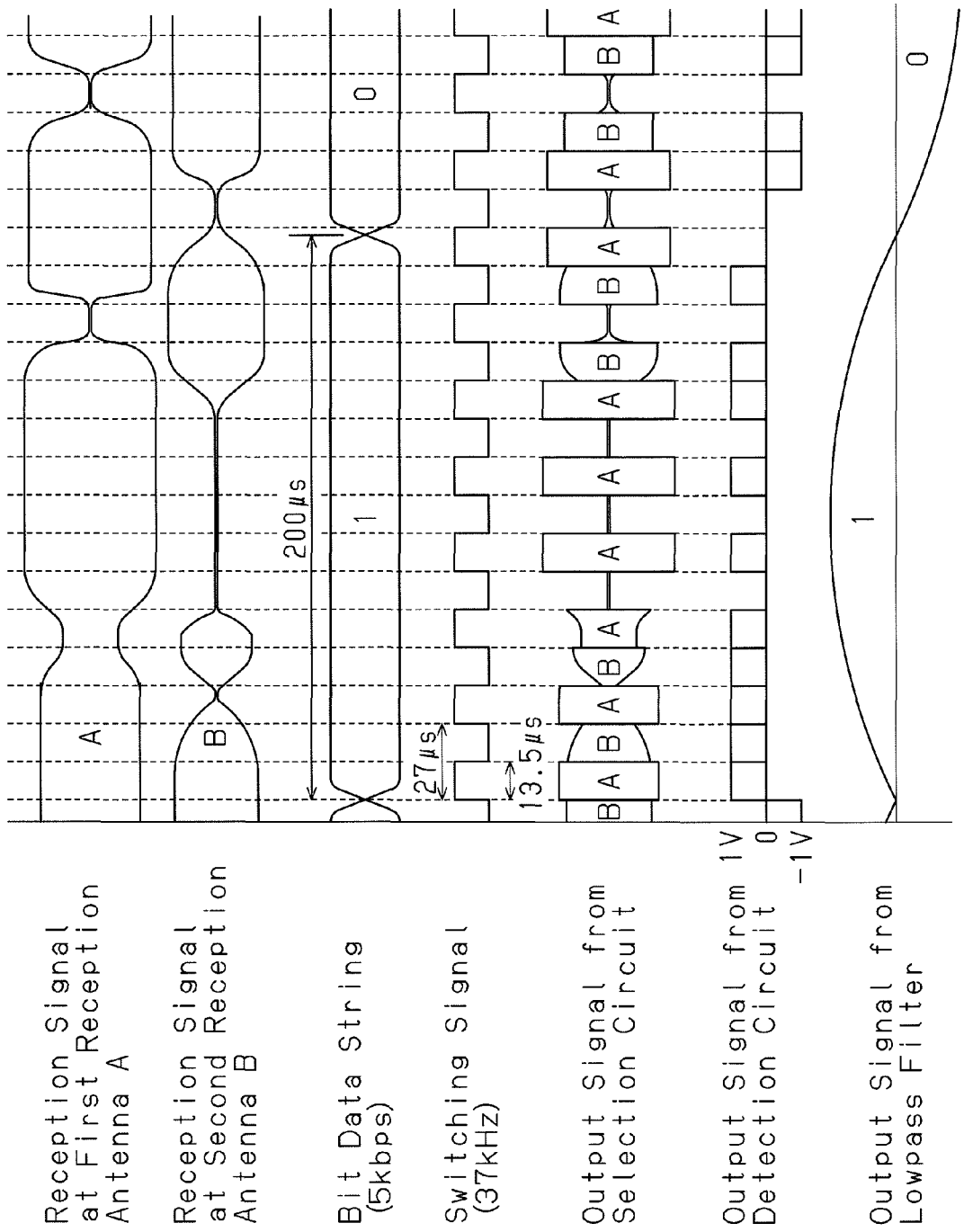
FIG. 3 is a time chart showing a manner for processing reception signals executed by the receiver of FIG. 2.
Figure 4:
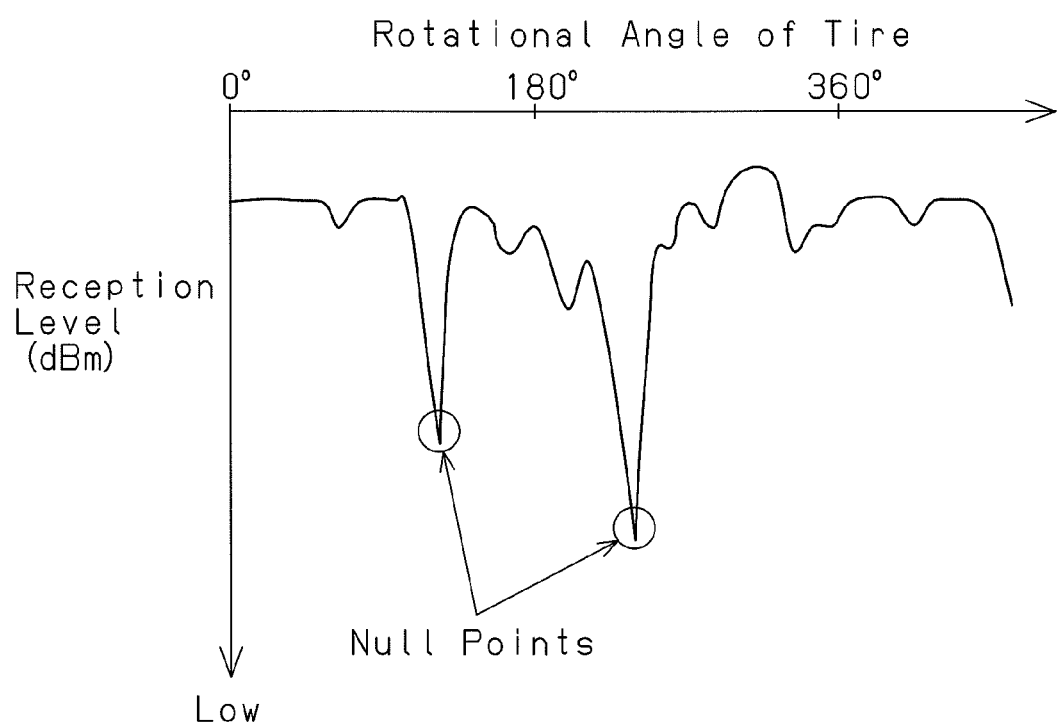
FIG. 4 is a graph showing an example of the relationship between the rotational angle of a tire and a radio wave reception level of the receiver.

FIG. 3 shows reception signals (in other words, the modulated waves that carry the transmission signals from the transmitters 3) at the two reception antennas 11, a bit data string included in the reception signals, a switching signal input from the oscillation circuit 19 to the selection circuit 12, an output signal from the selection circuit 12, an output signal from the detection circuit 15, and an output signal from the lowpass filter 17. A modulation system is a binary frequency modulation, the center frequency of the carrier wave is 315 MHz, and the transmission rate is 5 kbps (that is, the symbol rate is 5 kbaud). Also, the switching frequency of the switching signal is 37 kHz, that is, the switching cycle of the switching signal is 27 µs.

In FIG. 3, one of the two reception antennas 11 is referred to as a first reception antenna A, and the other one is referred to as a second reception antenna B. In regard to the reception signals received by the reception antennas A, B, the radio wave reception level is increased as the width is increased. Points where the width is almost zero correspond to null points. In regard to the bit data string included in the reception signal, 200 µs corresponds to the time required for transmitting one bit of data (that is, the transmission time for data per symbol).

The selection circuit 12 selects the first reception antenna A when the switching signal is rising, and selects the second reception antenna B when the switching signal is falling. Thus, the selection circuit 12 alternately selects the first reception antenna A and the second reception antenna B every 13.5 µs, and alternately outputs the reception signal at the first reception antenna A and the reception signal at the second reception antenna B every 13.5 µs. Therefore, as shown in FIG. 3, for the one bit of data (data of one symbol) corresponding to the transmission time of 200 µs, the reception signal (received wave) at the first reception antenna A and the reception signal (received wave) at the second reception antenna B are alternately extracted every 13.5 µs.

If one of the reception antennas 11 is selected in a state where the reception signal at that reception antenna 11 is in the condition corresponding to the null point, the reception signal at that reception antenna 11 cannot be substantially extracted. However, when the reception signal at one of the reception antennas 11 is at such a low level that demodulation is impossible, the reception signal at the other reception antenna 11 rarely becomes low level to an extent that demodulation is impossible. Moreover, such a state hardly continues for the entire transmission time of data per symbol.

In accordance with the output signal from the selection circuit 12, the detection circuit 15 obtains the output signal as shown in FIG. 3. A baseband signal per bit is obtained as shown in the lowest line of FIG. 3 by demodulating the output signal of the detection circuit 15 by the demodulation circuit 16, and then filtering the demodulated signal through the lowpass filter 17.

The preferred embodiment has the following advantages.

(1) The receiver 4 includes two reception antennas 11, which receive modulated waves (transmission signals) from the transmitters 3, the selection circuit 12, which alternately selects the two reception antennas 11 at the predetermined switching cycle to alternately obtain the modulated waves from the two reception antennas 11, and the demodulation section (15, 16), which demodulates the modulated wave obtained at the selection circuit 12 to generate the demodulated signal. The switching cycle is 27 µs, the transmission time for data per symbol in the transmission signal from each transmitter 3 is 200 µs. Thus, the switching cycle is 1/7.4 of the transmission time of data per symbol in the transmission signal from each transmitter 3. In other words, the modulated wave is alternately obtained from the two reception antennas 11 at least seven times each while the data of one symbol is transmitted. With this configuration, each bit of data of the transmission signal from the transmitter 3 is demodulated in a suitable manner based on the intermittent modulated waves alternately obtained from the two reception antennas 11.

Furthermore, since the selection circuit 12 simply performs switching operation to alternately select the two reception antennas 11 at the predetermined switching cycle, the configuration and the control are very simple as compared to the conventional apparatus employing the diversity system in which the levels of the reception signals are determined and switching operation is performed to select the reception signal having the greatest level. Thus, the configuration of the receiver 4 is simplified and the costs are reduced.

(2) The two reception antennas 11 are arranged apart from each other with a spacing corresponding to a quarter wavelength of the center frequency of the carrier wave used when transmitting the signals from the transmitters 3. In this manner, signals with different patterns are easily obtained from the two reception antennas 11, which allows, as much as possible, situations to be avoided in which the reception signals at the two reception antennas 11 both become low level to such an extent that demodulation is impossible.

The first embodiment may be modified as follows.

The switching cycle may be set to less than or equal to half the transmission time of data per symbol in the transmission signal from each transmitter 3 in accordance with Nyquist theorem (sampling theorem). In other words, the switching frequency (Hz) may be set twice or more of the symbol rate (baud) of the transmission signals from the transmitters 3. Furthermore, in other words, the switching cycle may be set such that the modulated wave from each reception antenna 11 is obtained twice or more while the data of one symbol is transmitted. In this case also, each bit of data in the transmission signal from each transmitter 3 is demodulated in a suitable manner based on the intermittent modulated waves obtained alternately from the two reception antennas 11. Also, the switching cycle is preferably in the range of ⅕ to ⅛ of the transmission time of the data per symbol.

As shown by the dashed line in FIG. 2, a low-noise amplifier circuit (LNA) 30 may be provided between each of the reception antennas 11 and the selection circuit 12. With this configuration, the transmission loss of the signal can be reduced as compared to the preferred embodiment. The amplifier circuit 14 may be omitted when this configuration is employed.

The number of the reception antennas 11 may be greater than or equal to n (n is an integer greater than or equal to three). In this case, a time required for sequentially switching the reception antennas 11 the number of which is n is referred to as the switching cycle, and the switching cycle may be set to ½ or less of the transmission time of data per symbol.

The modulation system does not need to be limited to the binary frequency modulation, but may be, for example, a phase modulation or a multi-level modulation.

What is claimed is:

1. A receiver for a tire condition monitoring apparatus, the receiver receiving a tire condition detection signal transmitted from a transmitter provided in a tire of a vehicle on a modulated wave, the receiver comprising:
- at least two reception antennas, which receive the modulated wave;
- a selecting section, which alternately selects one of the at least two reception antennas at a predetermined switching cycle to alternately obtain the modulated wave from the at least two reception antennas; and
- a demodulation section, which generates a demodulated signal by demodulating the modulated wave obtained at the selecting section,
- wherein the switching cycle is half or less of the transmission time of data per symbol in the tire condition detection signal.

2. The receiver according to claim 1, wherein the switching cycle is defined such that the modulated wave is obtained from each reception antenna at least twice or more while data of one symbol is transmitted.

3. The receiver according to claim 1, wherein the switching cycle is in the range of $1/5$ to $1/8$ of the transmission time of the data per symbol.

4. The receiver according to claim 1, wherein the at least two reception antennas are arranged apart from each other with a spacing corresponding to a quarter wavelength of a center frequency of a carrier wave before modulation.

5. The receiver according to claim 1, further comprising a lowpass filter, which filters the demodulated signal.

6. The receiver according to claim 1, wherein a low-noise amplifier circuit is provided between each reception antenna and the selecting section.

7. A receiver for a tire condition monitoring apparatus, the receiver receiving a tire condition detection signal transmitted from a transmitter provided in a tire of a vehicle on a modulated wave, the receiver comprising:
- at least two reception antennas, which receive the modulated wave;
- a selecting section, which alternately selects one of the at least two reception antennas at a predetermined switching frequency to alternately obtain the modulated wave from the at least two reception antennas; and
- a demodulation section, which generates a demodulated signal by demodulating the modulated wave obtained at the selecting section,
- wherein the switching frequency (Hz) is twice or more of a symbol rate (baud) of the tire condition detection signal.

8. A method for receiving a tire condition detection signal transmitted from a transmitter provided in a tire of a vehicle on a modulated wave by a receiver provided in a vehicle body, the method comprising:
- receiving the modulated wave by at least two reception antennas;
- alternately selecting the at least two reception antennas at a predetermined switching cycle to alternately obtain the modulated wave from the at least two reception antennas, wherein the switching cycle is half or less of the transmission time of data per symbol in the tire condition detection signal; and
- generating a demodulated signal by demodulating the modulated wave obtained alternately.

* * * * *